Sept. 17, 1929.   F. E. COLLIER   1,728,393
SAW CARRIER FOR SAW FILING MACHINES
Filed Jan. 19, 1928   2 Sheets-Sheet 1
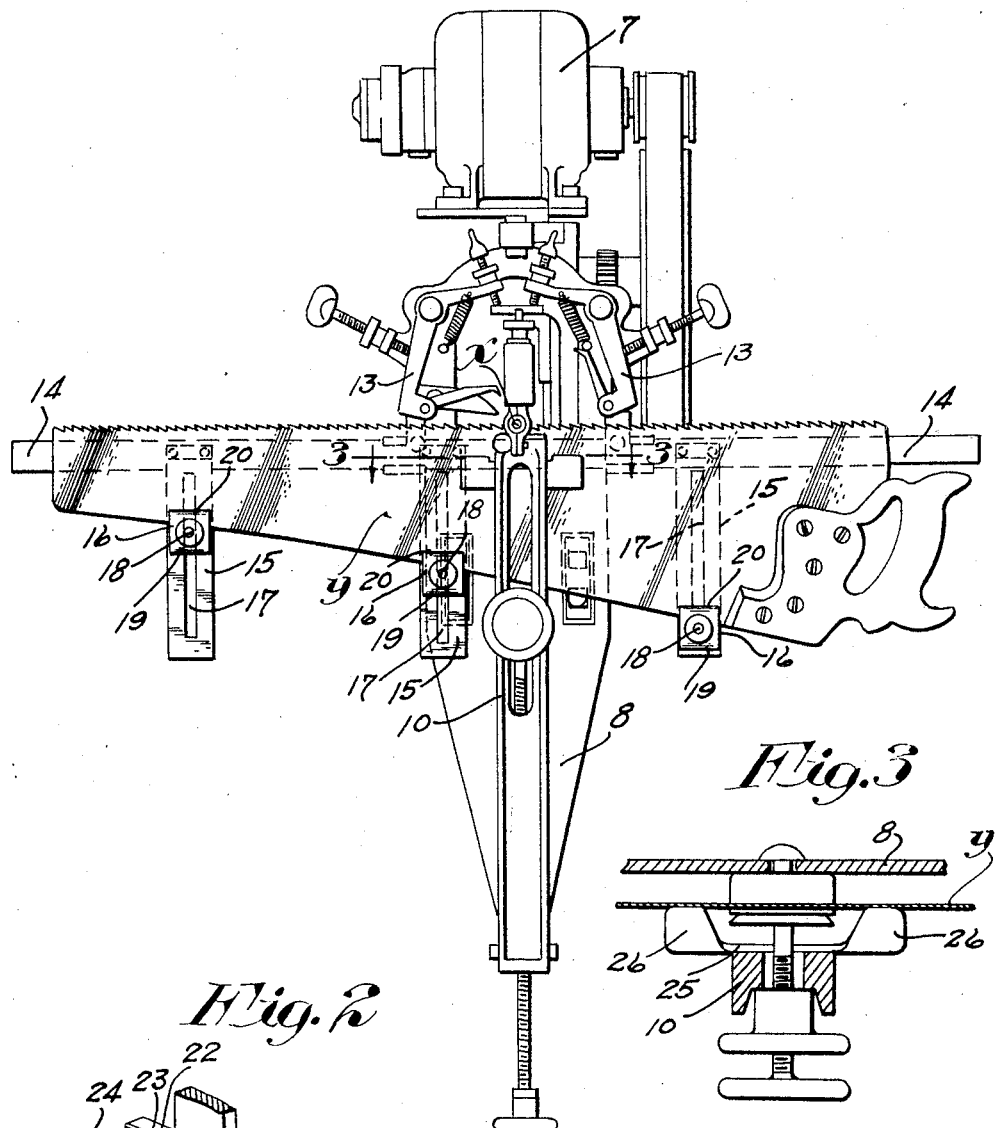
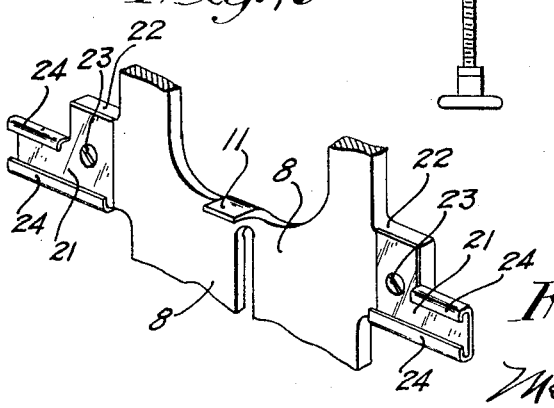
Inventor
Freeman E. Collier
By his Attorneys
Merchant and Kilgore

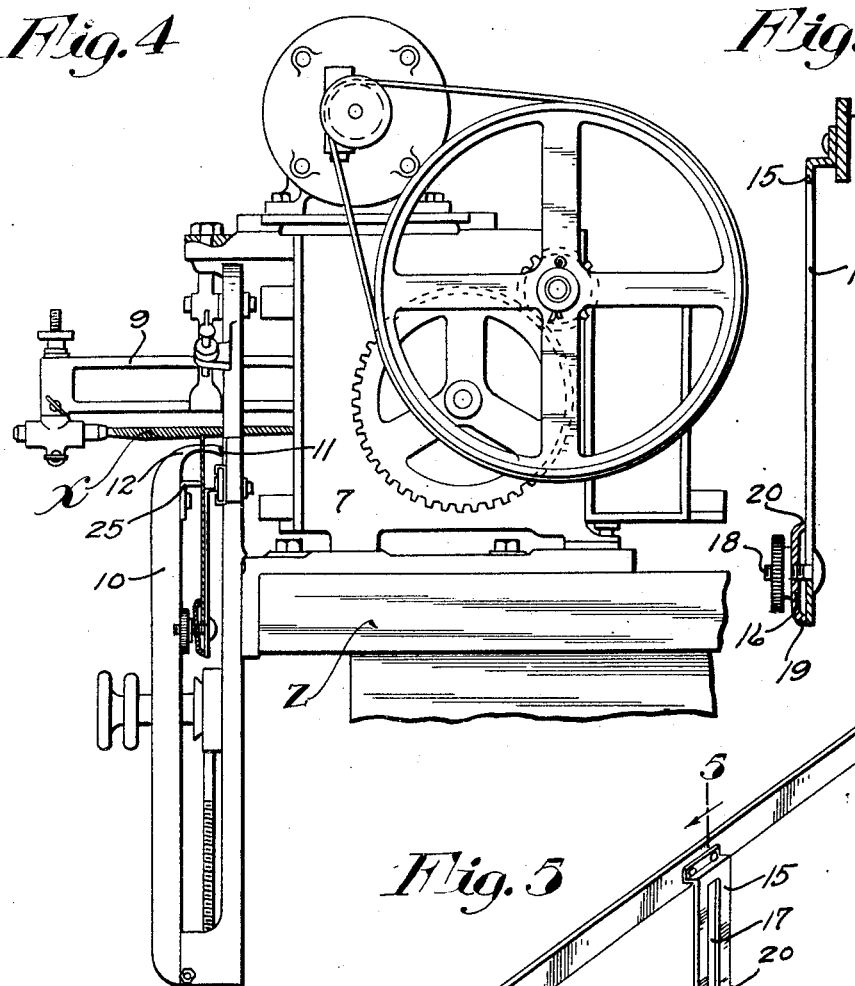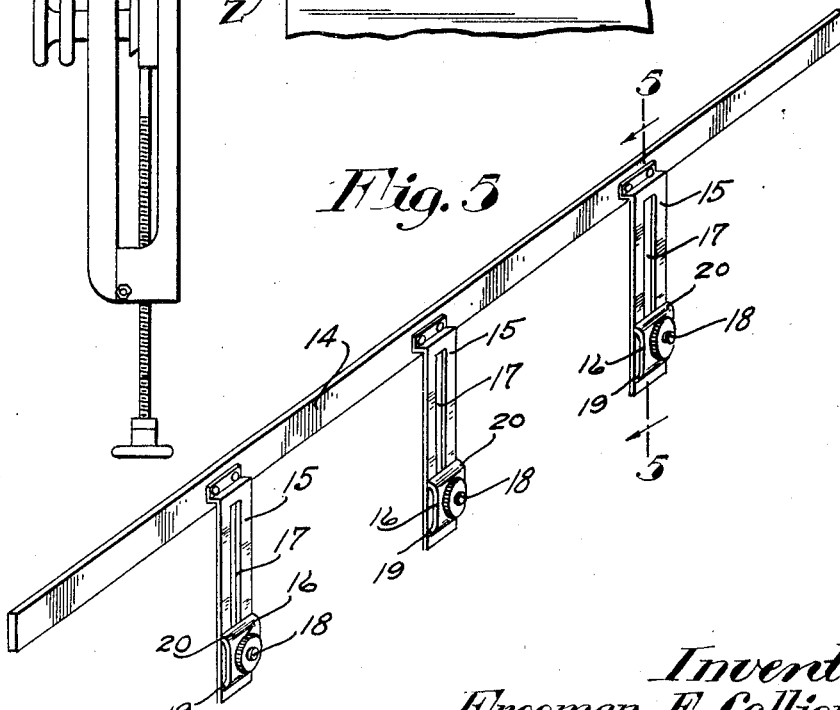

Patented Sept. 17, 1929

1,728,393

UNITED STATES PATENT OFFICE

FREEMAN E. COLLIER, OF MINNEAPOLIS, MINNESOTA, ASSIGNOR TO FOLEY SAW TOOL COMPANY, INCORPORATED, OF MINNEAPOLIS, MINNESOTA, A CORPORATION OF MINNESOTA

SAW CARRIER FOR SAW-FILING MACHINES

Application filed January 19, 1928. Serial No. 247,819.

My present invention has for its object to provide a simple and highly efficient saw carrier for saw filing machines, and to this end it consists of the novel devices and combinations of devices hereinafter described and defined in the claim.

The invention, while adapted for use in connection with various different types of saw filing machines, is especially well adapted for use in connection with the saw filing machine disclosed and broadly claimed in my United States Letters Patent No. 1,674,853 of date June 26, 1928.

In the accompanying drawings, which illustrate the invention, like characters indicate like parts throughout the several views.

Referring to the drawings:

Fig. 1 is a view in front elevation of a saw filing machine having the invention embodied therein;

Fig. 2 is a fragmentary perspective view of the face plate of said machine and way for the saw carrier;

Fig. 3 is a detail view partly in plan and partly in horizontal section taken on the line 3—3 of Fig. 1, on an enlarged scale;

Fig. 4 is a view principally in side elevation of the parts shown in Fig. 1;

Fig. 5 is a perspective view of the saw carrier removed from the saw filing machine; and Fig. 6 is a detail view principally in section taken on the line 5—5 of Fig. 5, on an enlarged scale.

The saw filing machine illustrated for the purpose of showing the invention applied thereto in working position is of the type shown in the above identified application. Said saw filing machine, as shown, is operated by an electric motor and indicated as an entirety by the numeral 7 with the exception of the face plate 8, carrier 9 for the file $x$, vice member 10, co-operating jaws 11 and 12 on the face plate and vice member, respectively, levers 13 for automatically imparting a step by step feeding movement to a saw $y$ mounted in the improved saw carrier. The saw filing machine 7 is mounted on a bench $z$.

The saw carrier comprises a long straight horizontal bar 14 set verticallly edgewise, a plurality of depending edgewise spaced flat arms 15, and clamps 16 on said arms. The upper end portions of the arms 15 are rigidly secured to the outer face of the bar 14 at the transverse center thereof. These arms 15, above the lower longitudinal edge portion of the bar 14, are laterally and outwardly offset so that the bodies of said arms are offset from the outer face of the bar 14 and extend parallel thereto. Formed in each arm 15 is a longitudinally extended slot 17. The clamps 16 are in the form of flat plates of substantially the same width as the arms 15 and are attached to said arms by thumb-nut-equipped bolts 18 which extend through the slot 17 and bores in the centers of the clamps 16. The bolts 18 where they project through the slot 17 at the backs of the arms 15 are square in cross section so as to hold said bolts from turning in the slot 17. The lower ends of the clamps 18 are turned laterally inward to afford fulcrum lugs 19 which bear against the outer faces of the arms 15. The upper ends of the clamps 16 are also turned laterally inward to afford wide jaws 20 that engage the saw $y$ and hold the same clamped against the arms 15 with its back resting on the bolts 18.

The saw carrier is removably mounted in a two-part way 21, the members of which are endwise horizontally spaced, mounted in seats formed in extensions 22 on the vertical edges of the face plate 8 and detachably secured thereto by screws 23. The members of the way 21 in cross section are in the form of channels set vertically edgewise and having on their sides inturned retaining flanges 24. The outer faces of the backs of the members of the way 21 are flush with the outer surface of the face plate 8. The carrier bar 14 is mounted in the way 21 with freedom for endwise sliding movement but securely held thereby against movement in all of the directions.

In mounting the saw $y$ in the carrier, as best shown in Fig. 1, the bolts 18 are adjusted in the slots 17 so as to engage and support said saw at its back with the points of the teeth of the saw parallel to the upper edge of the carrier bar 14 and extend thereabove the proper distance to be acted on by the file x during its reciprocating movement. It may be here stated that the filing action takes place during the inward movement of the file and during the return movement thereof the file carrier 9 is raised so as to carry the file x out of contact with the teeth of the saw.

After the bolts 18 have been properly adjusted, the nuts thereon are operated to cause the jaws 20 of the clamps 16 to engage the outer face of the saw y and securely clamp the same against the arms 15. The vice member 10 is then operated to set its jaw 12 in proper relation with the jaw 11 so that said jaws firmly hold the saw x against lateral movement during the filing action with just sufficient clearance to permit free feeding action of the saw which is imparted thereto by one of the levers 13 depending on which way the saw x is being fed.

To further assist the clamps 16 and jaws 11 and 12 in firmly holding the saw y during filing action, there is secured to the vice member 10 below its jaw 12 a horizontally extended guide lug 25 having at its ends two contact points 26 which engage the saw y directly opposite the bar 14 and with the tooth being filed therebetween.

The above described saw carrier, while firmly holding the saw y during filing action, permits free straight-line endwise movement of said carrier during the step by step feeding action of the saw. The saw carrier may be readily removed from the saw filing machine or applied thereto simply by sliding the same endwise out of or into the way 21. By providing the saw carrier with three edgewise spaced arms 15 against which the saw is firmly held by the clamp 16, said saw is held straight and the guide lug 25 holds the saw at its toothed edge inward against the arms 15.

What I claim is:

The combination with a saw filing machine having a saw carrier way provided with upper and lower channels vertically spaced to leave a horizontal passageway therebetween, of a saw carrier including a flat horizontal bar, set vertically edgewise with its longitudinal edge portions slidably mounted in the channels of the way, a plurality of flat depending arms the upper ends of which are directly and rigidly secured to the outer face of the bar and spaced from the upper and lower edges thereof, said arms at their attachment with the bar being laterally and outwardly offset through the passageway between the channels of the way, said arms having vertically extended slots, saw clamps co-operating with the outer faces of the arms, and nut-equipped bolts extending through the slots in the arms and apertures in the clamps to adjustably attach the clamps to the arms.

In testimony whereof I affix my signature.

FREEMAN E. COLLIER.